May 9, 1961 C. H. GULDAGER 2,983,001
WINDOW STRUCTURE
Filed Sept. 23, 1958 2 Sheets-Sheet 1
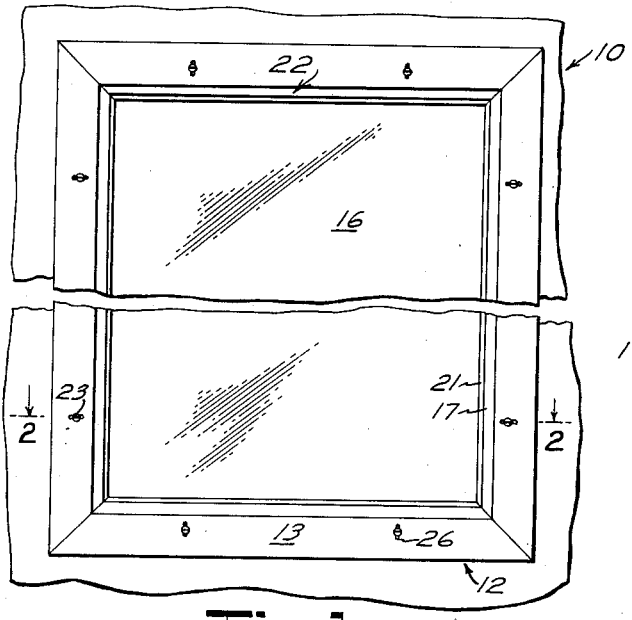
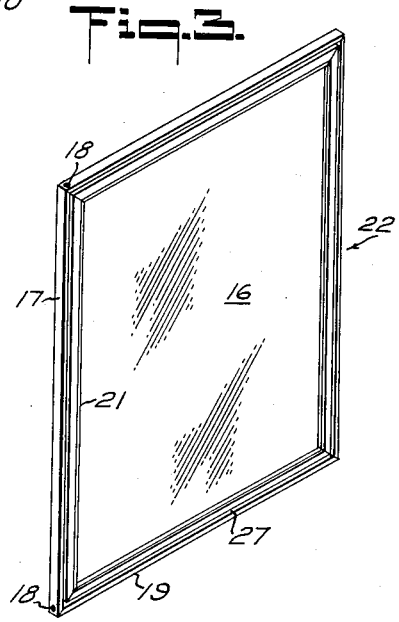
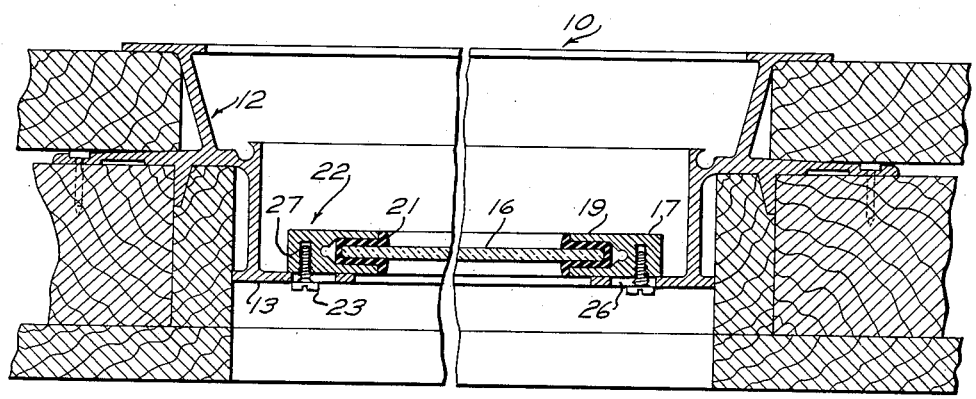
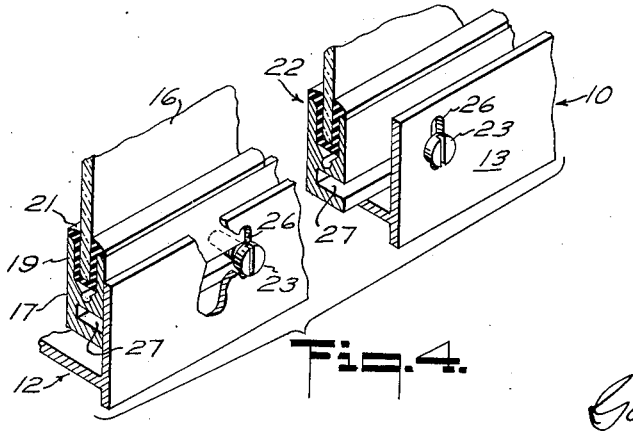
INVENTOR
CLINTON H. GULDAGER
BY
Gardner & Zimmerman
ATTORNEY May 9, 1961 C. H. GULDAGER 2,983,001
WINDOW STRUCTURE
Filed Sept. 23, 1958 2 Sheets-Sheet 2

INVENTOR
CLINTON H. GULDAGER
BY
ATTORNEYS

United States Patent Office 2,983,001
Patented May 9, 1961

2,983,001
WINDOW STRUCTURE
Clinton H. Guldager, 1531 Hillgrade, Walnut Creek, Calif.

Filed Sept. 23, 1958, Ser. No. 762,884

5 Claims. (Cl. 20—40)

The present invention generally relates to window construction, and more particularly to an improved means of mounting a pane or sheet of glass, plastic, etc. in a window frame.

The limitations of putty as a means of glazing a window are well known. For one thing in utilizing putty for holding and sealing the pane in a window frame, particularly for metal sash, the putty must generally be applied after the window frame has been secured in position. This entails considerable work on the job of the glazier and possible damage to the putty and seal before the putty has become hardened.

An improvement over the use of putty, is an arrangement in which the edges of the glass pane are placed in a preformed sealing and retaining strip, such as of vinyl or rubber, which is in turn inserted and retained in a rim member, the latter being provided as either an integral or as a separate part of the window frame. In the latter instance the rim is arranged for attachment to the window frame. The sealing strip is of channel shape cross-section open at the inner periphery to receive the glass. The rim is generally of metal, but particularly when formed separate of the window frame may be constructed of plastic or other suitable material. Like the sealing strip, the rim is formed with a groove on its inner periphery in which the sealing strip with the edges of glass therein is contained. In the instance where the rim is separate from the frame, installation may be effected by orienting the rim on the frame, and then drilling holes through the rim and frame so that the rim may be secured to the frame by screws. However, this has been found unsatisfactory since it requires relatively expensive operations at the site of installation of the window. On the other hand, to provide the separate rim and sash portions with preformed screw receiving holes has been found to be impractical since the relatively large tolerances dictated by economical manufacturing considerations result in lack of the necessary alignment of the holes in the parts, and great difficulty is thus encountered in attempting assembly of the rim and frame combination.

It is therefore an object of the present invention to provide an improved mounting arrangement for installing rimmed window panes in the window frame structure.

It is another object of the present invention to provide a window rim and frame assembly permitting accurate mounting of the rim in the frame without any special operations being necessary.

Another object of the invention is to provide a mounting arrangement of the character described in which the rimmed window member may be easily assembled on the associated member of the window frame structure and rigidly attached thereto in proper oriented position thereon by means of screws or the like without requiring on-the-job drilling of aligned apertures on the two members.

A still further object of the invention is to provide a structure which permits of the aforesaid mounting and attachment, and at the same time lends itself to incorporation therewith of means providing for removal to the exterior of the window, of any condensate which may collect on the interior surface thereof.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is an elevational view of a metal window embodying the features of the present invention.

Figure 2 is an enlarged cross-sectional view taken in the horizontal plane 2—2 of Figure 1 through the window.

Figure 3 is a perspective view of a window pane rim constructed in accordance with the teachings of this invention.

Figure 4 is an enlarged partial perspective view illustrating the frame-rim joinder of Figure 2.

Figure 5:
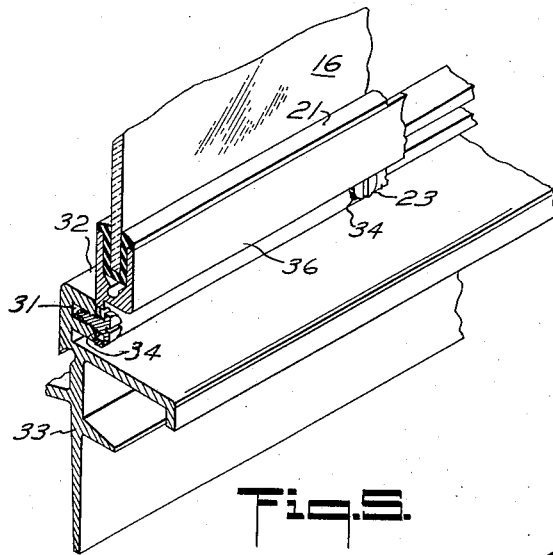
Figure 5 is another partial perspective view of a modified form of connection between the frame and rim.

Considering now the invention in some detail, and referring to the drawings, there is shown in Figure 1, a window structure having a fixed frame 10. The features of the invention can be equally well applied to pivotally mounted frames or other types mounted in fixed frames. As will be understood, the frame 10 as shown is fitted in an opening in the wall of a building, etc. and includes a body portion 12 and flanges for positioning the frame in the opening. As a part of the frame there is also provided a flange 13 extending generally coplanar of the frame and inwardly from the body portion 12.

Closure of the opening defined by the frame 10 and particularly the flange 13 is afforded by means of rim member 17 arranged for attachment to flange 13 and forming a marginal reenforcement and mounting for a pane 16 of glass or the like. It should be pointed out that where the term "pane" is used, it is meant to include a sheet of plastic, screen or other material as well as glass. The rim 17 may be constructed and assembled in the manner of a picture frame, i.e., the two side, top and bottom sections are mitered and joined together at the rim corners with securing means such as screws 18. Each of the rim sections is formed of U-shape cross-section with a channel 19 having its open side along the inner periphery of the rim to receive the pane therein. Channel 19 is made wider than the pane thickness, and water-tight joinder of the pane and rim is accomplished by a resilient stripping 21 of vinyl, rubber, or the like, which fits around the edges of the pane and is inserted therewith in the channel 19. Suitable ribs or the like may be formed on the exterior of the stripping to insure a tight fit of same in the rim channel.

The manner and means of affixing the rimmed member 22, that is the rim and pane 16, to the frame 10, specifically to the flange 13, forms an important part of the present invention. In the preferred embodiments, such means includes the use of screws 23 designed for engagement with a novel combination of screw-receiving portions on the rim and flange 13, such portions being arranged so that when the rim member is placed in proper oriented position on the frame member, portions of the screw-receiving means on the different members automatically become aligned to permit engagement by the screws and the permanent attachment of the members by means of the screws. As illustrated in the embodiment of the invention in Figures 1 to 4, there is provided in the flange 13, portions having holes 26 for the reception of the screws 23. These holes are provided in the top, bottom, and side sections of the flange, and as shown in Figure 1, a set of two holes is formed in each section. It will be understood the number of holes will vary in accordance with the size of the windows. The holes are elongated transversely in a direction normal to the length of the sections and for a purpose to be hereinafter explained.

Formed in each of the sections of the rim 17 to provide the other of the screw-receiving portions aforesaid, is a groove 27 which extends lengthwise along the sections but with its transverse axis perpendicular to the corresponding axis of the pane-receiving channel 19. The word "groove" as used herein is intended to include any recessed or other portion which will serve the general purpose of the groove as set forth herein. The open side of the groove is on the side of the rim arranged to be positioned against the flange 13 and its location on such side is such that a portion thereof will be opposite a portion of each of the holes in the flange when the rim member is operatively positioned on the frame. The width of the slots and groove is such that the screws may be inserted and fitted therein, and thus when the rim is positioned on the frame as aforesaid, there will be provided at the intersection of the slots and groove, openings in full and complete registration for reception and engagement of the screws.

To install the rim on the frame, it is placed in engagement with the flange 13 and oriented in proper position thereon. The screws are inserted from the interior side of the flange into the portion of the slots opposite the groove. The screws are of the self-tapping type so that when extended into the groove and rotated, the threads will cut into the side walls of the groove and in cooperation with the head of the screws draw the rim firmly against the flange. As will be evident the engagement of the screws in the groove portions in the horizontal sections of the rim hold the rim against vertical displacement on the frame while the engagement of the screws in the vertical sections hold the rim against horizontal displacement. In this connection it may also be noted that the screws are designed to cut into the sides of the slots thereby not only facilitating the mounting operations but preventing shifting of the screws in the slots when operatively engaged therein.

As will be seen from the drawings neither the groove nor the slots are visible from the exterior of the window, and the screws are accessible only from the interior side of the window.

It may be mentioned that by utilizing the extrusion process for the formation of the rim sections, the groove may be readily provided therein without the need of expensive machine operations and thus the cost of manufacture of the rim is reduced to a minimum.

In Figure 5, is shown a modified form of the invention. In this embodiment the groove portions instead of being provided on the rim member as shown in Figures 1 to 4, are formed as indicated at 31 in a flange 32 of the window frame member 33. Holes or slots 34 which correspond with the holes or slots 26 are provided instead on the rim member 36. With this arrangement, the rim member is secured upon the surface of the frame flange.

Figure 6:
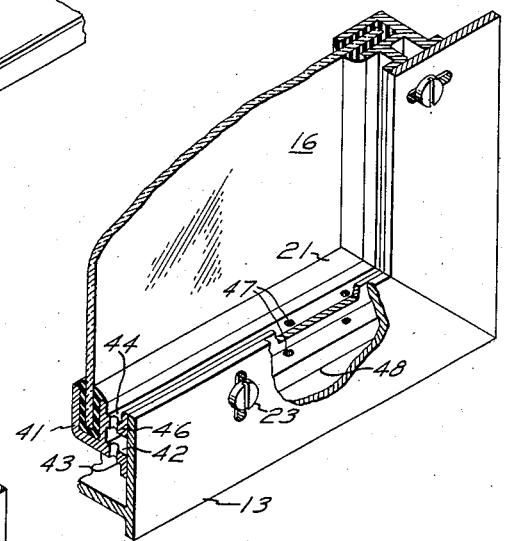
Figures 6, 7 and 8 are additional partial perspective views illustrating various forms of frame-rim joinders incorporating a condensate drain.
Figure 8:
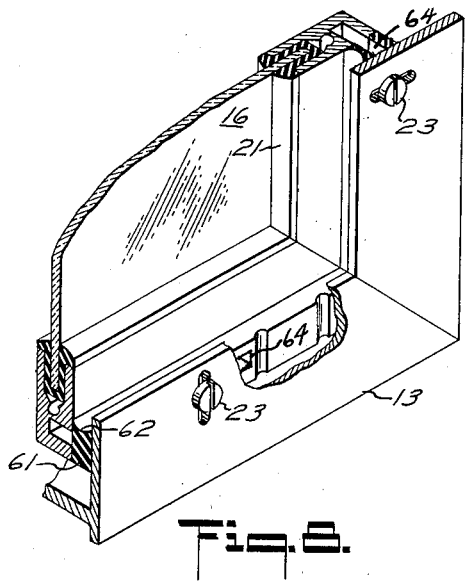
Figure 7:
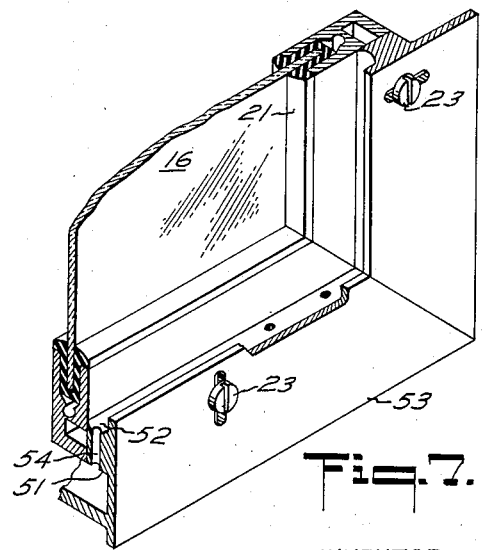

The arrangement of the members employed in the application of the invention, lends itself to incorporation therein of means for eliminating the accumulation of condensate on the interior side of the window. In the embodiments disclosed in Figures 6 to 8, such means are shown as a part of the construction. In the arrangement in Figure 6 the portion of the rim 41 containing the screw-receiving groove 42, is formed as a shoulder or boss 43 which extends laterally from the side of the rim and adapted to be held against the flange 13 by the screws 23 in the manner heretofore described. The provision of the lateral protuberance 43 besides incidentally making possible a narrower rim, forms a spacer in which a depression 44 may be provided so that the portion 46 thereof along the base of the pane may constitute a self-contained trough for trapping the condensate and draining it to the exterior of the window. Small drain openings 47 are provided in the depressed portion 46, and such openings lead to the underside 48 of the rim which as will be seen from the drawing is on the exterior side of the window.

If desired the part arranged to contain the depression and drain holes may be formed integrally with the frame flange instead of with the rim. Thus in Figure 7, the shoulder or spacer 51 provided with the trough 52 is made part of flange 53 and held against the grooved side of the rim by the screws 23. The holes 54 for the screws extend through the spacer. In the embodiment illustrated in Figure 8, the spacer part 61 is formed separate of both the flange and the rim and is set inward from the inner periphery of the flange so as to provide a depression 62 on the interior side of the window. In this arrangement the spacer besides being formed with the drain holes, may be provided with openings 64 to afford the screws access to the groove in the rim.

What is claimed is:

1. Apparatus of the character described including a first frame member having a plurality of permanently connected adjoining sections defining and completely surrounding an opening and adapted to be positioned in a building opening, a second rim member adapted to contain a window or the like and having a plurality of permanently connected adjoining sections substantially corresponding to and adapted to be positioned against and secured to the adjacent sections of said first member, one of said members having a groove extending generally normal to the plane of said opening with the opening of said groove positioned toward the other member, such other member having a plurality of slots therethrough in communication with and substantially normal to said groove, and fastening means extending through said slots and engageable in said groove for securing said members together.

2. A window structure comprising a rim member having a channel about the inner periphery for receiving the entire periphery of a window pane therein, a window frame member defining and completely surrounding a window opening, means in one of said members defining a groove extending substantially peripherally of said window pane, and means in the other member defining cooperating slots in communication with and extending generally normal to the length of said groove, and screws adapted for extension through selected portions of said slots into selected portions of said groove for joinder of window frame and rim members in adjustable orientation.

3. In a window structure of the character described, a frame member formed with a plurality of adjoining angularly related sections defining an opening and being secured together permanently against relative movement, a window-pane-enclosing and retaining member having adjoining angularly related sections substantially corresponding with and arranged for positioning over and in registration with said first member and so as to support a pane to cover said opening, one of said members having at least one slot in each of the sections thereof extending transversely of the length thereof and in the general plane of the member, the other of said members having combined therewith substantially continuous groove means extending along the length of the respective sections and in communication with the slots and elongated in a direction at right angles thereto, said groove opening against a surface of said one member, and fastening members formed to extend through and engage in said slots and openings and to be movable in the direction of the elongations of the slots and grooves.

4. A window structure comprising a generally rectangular frame defining a window opening and having a peripheral flange extending into said opening and formed with transverse slots therethrough along each of the sides of the frame, and a rim formed separate of the frame containing a window therein and having a portion to abut against the flange, said rim also having in said portion a groove positioned to register with at least one of said slots and extending at right angles thereto, said slots and groove being arranged in intersecting relation to receive common securing means for holding the rim to the flange of said frame in adjustable relation.

5. A window structure comprising a frame defining a window opening and having a substantially continuous groove therein extending parallel to the sides of the opening, a window-pane containing-rim arranged for positioning against said frame in predetermined orientation and having therein a plurality of transversely slotted portions adapted to overlie said groove in intersecting relation when the rim is positioned on the frame as aforesaid, and a plurality of self-tapping screws disposed one through each of the rim slots and into said groove to grip the latter so as to secure said rim to the frame in said position.

References Cited in the file of this patent

UNITED STATES PATENTS

| | | |
|---|---|---|
| 1,343,416 | Stacke | June 15, 1920 |
| 2,316,442 | Lootens | Apr. 13, 1943 |
| 2,570,336 | Fouts | Oct. 9, 1951 |
| 2,654,451 | Schmidgall | Oct. 6, 1953 |
| 2,768,716 | Gillespie | Oct. 30, 1956 |
| 2,769,657 | Frie et al. | Nov. 6, 1956 |
| 2,770,334 | Rust et al. | Nov. 13, 1956 |
| 2,816,632 | Nardulli | Dec. 17, 1957 |

FOREIGN PATENTS

| | | |
|---|---|---|
| 853,062 | Germany | Oct. 20, 1952 |
| 1,079,458 | France | May 19, 1954 |